US007983993B2

(12) United States Patent
Graves et al.

(10) Patent No.: US 7,983,993 B2
(45) Date of Patent: *Jul. 19, 2011

(54) AUTHENTICATED PAYMENT (75) Inventors: Michael E. Graves, Redwood City, CA (US); Peter E. Frank, Redwood City, CA (US); Thane Plambeck, Palo Alto, CA (US); Gregory R. Whitehead, Menlo Park, CA (US)

(73) Assignee: VeriSign, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/842,270

(22) Filed: Jul. 23, 2010

(65) Prior Publication Data
US 2010/0293100 A1 Nov. 18, 2010

Related U.S. Application Data (63) Continuation of application No. 09/818,084, filed on Mar. 26, 2001, now Pat. No. 7,778,934.

(51) Int. Cl.
*G06Q 99/00* (2006.01)
(52) U.S. Cl. ............... 705/67; 705/50; 705/64; 705/65; 705/76; 705/78; 713/150; 726/26; 380/277; 235/389
(58) Field of Classification Search .............. 705/50–79; 380/277; 235/389; 713/150; 726/26
See application file for complete search history.

(56) References Cited

U.S. PATENT DOCUMENTS

| 5,420,926 A | 5/1995 | Low et al. |
| 5,633,930 A | 5/1997 | Davis et al. |
| 5,710,887 A | 1/1998 | Chelliah et al. |
| 5,724,424 A | 3/1998 | Gifford |
| 5,748,737 A * | 5/1998 | Daggar .................. 705/41 |
| 5,793,028 A | 8/1998 | Wagener et al. |
| 5,794,207 A | 8/1998 | Walker et al. |
| 5,850,446 A | 12/1998 | Berger et al. |
| 5,878,141 A | 3/1999 | Daly et al. |
| 5,899,980 A | 5/1999 | Wilf et al. |
| 5,905,248 A | 5/1999 | Russell et al. |
| 5,991,413 A | 11/1999 | Arditti et al. |

(Continued)

FOREIGN PATENT DOCUMENTS

AU 58665/01 9/2001

(Continued)

OTHER PUBLICATIONS

Search Report corresponding to the application No. PCT/US01/12445 dated Dec. 28, 2001.

(Continued)

*Primary Examiner* — Jalatee Worjloh
(74) *Attorney, Agent, or Firm* — Finnegan, Henderson, Farabow, Garrett & Dunner, LLP (57) ABSTRACT A buyer (110) wishes to use a payment instrument as part of an online commerce transaction with a seller (120) and it is desired to authenticate that the buyer (110) has authority to use the payment instrument. A separate authentication service (130) determines whether the buyer (110) has access to certain secret information without revealing the secret information to the seller (120). Access to the secret information would verify that the buyer (110) has authority to use the payment instrument. The authentication service (130) informs the seller (120) whether the buyer (110) is authorized to use the payment instrument.

19 Claims, 9 Drawing Sheets

U.S. PATENT DOCUMENTS

| | | | |
|---|---|---|---|
| 5,996,076 | A | 11/1999 | Rowney et al. |
| 6,000,832 | A | 12/1999 | Franklin et al. |
| 6,018,724 | A | 1/2000 | Arent |
| 6,029,150 | A | 2/2000 | Kravitz |
| 6,047,268 | A | 4/2000 | Bartoli et al. |
| 6,073,237 | A | 6/2000 | Ellison |
| 6,098,053 | A | 8/2000 | Slater |
| 6,125,185 | A | 9/2000 | Boesch |
| 6,178,409 | B1 | 1/2001 | Weber et al. |
| 6,205,437 | B1 | 3/2001 | Gifford |
| 6,212,634 | B1 | 4/2001 | Geer, Jr. et al. |
| 6,324,525 | B1 | 11/2001 | Kramer et al. |
| 6,327,578 | B1 | 12/2001 | Linehan |
| 6,327,662 | B1 * | 12/2001 | Araujo ................ 726/3 |
| 6,449,599 | B1 | 9/2002 | Payne et al. |
| 6,473,740 | B2 | 10/2002 | Cockrill et al. |
| 6,516,056 | B1 | 2/2003 | Justice et al. |
| 6,607,136 | B1 | 8/2003 | Atsmon et al. |
| 6,697,824 | B1 | 2/2004 | Bowman-Amuah |
| 7,742,967 | B1 | 6/2010 | Keresman, III |
| 2001/0014158 | A1 | 8/2001 | Baltzley |
| 2001/0037451 | A1 | 11/2001 | Bhagavatula et al. |
| 2001/0044787 | A1 | 11/2001 | Shwartz et al. |
| 2002/0046169 | A1 | 4/2002 | Keresman, III et al. |
| 2002/0077978 | A1 | 6/2002 | O'Leary et al. |
| 2003/0014372 | A1 | 1/2003 | Wheeler et al. |
| 2003/0120554 | A1 | 6/2003 | Hogan et al. |
| 2003/0140007 | A1 | 7/2003 | Kramer et al. |
| 2003/0208684 | A1 | 11/2003 | Camacho et al. |
| 2003/0212642 | A1 | 11/2003 | Weller et al. |
| 2004/0044627 | A1 | 3/2004 | Russell et al. |
| 2004/0172552 | A1 * | 9/2004 | Boyles et al. ................ 713/200 |
| 2004/0199431 | A1 | 10/2004 | Ganesan et al. |
| 2004/0243520 | A1 | 12/2004 | Bishop et al. |

FOREIGN PATENT DOCUMENTS

| | | |
|---|---|---|
| JP | 08096034 | 4/1996 |
| KR | 2000-14231 | 3/2000 |
| WO | WO 97/49052 | 12/1997 |
| WO | WO 99/42961 | 8/1999 |
| WO | WO 99/49404 | 9/1999 |

OTHER PUBLICATIONS

Examination Report corresponding to the European application No. 01932565.3 dated Dec. 19, 2006.

Australian Examination Report corresponding to the Australian application No. 2001259080 dated Nov. 4, 2005.

Office Communication corresponding to the Mexican application No. PA/a/2002/010220.

Identrus Media Center, "Indentrus wins top security and electronic commerce honor for innovative business-to-business Internet commerce trust model," New York, Dec. 6, 1999, <http://web.archive.org/web/20001025154826/www.identrus.com/pressreleasehtm/media120699.htm>.

Christy Hudgins-Bonafield, "Simplicity Lies at the Heart of iPin's New Online Payment Scheme," iPIN News & Press, Network Computing, Oct. 4, 1999, <http://web.archlve.org/web/20000301131901/www.ipin.com/news/network_computing.html>.

IBM Technical Disclosure Bulletin, "Transaction Completion Code Based on Digital Signatures," pp. 1109-1122, Aug. 1985.

Web site for SET Secure Electronic Transaction LLC, 2001 (home page provided) [retrieved on Sep. 6, 2001]. Retrieved from the Internet: <URL: http://www.setco.org.

SET Secure Electronic Transaction Specification, Book 1: Business Description [online]. SET Secure Electronic Transaction LLC, Version 1.0, May 31, 1997 [retrieved on Sep. 6, 2001]. Retrieved from the Internet: <URL: http://www.setco.org/download/set_bk1.pdf. 80 pages.

SET Secure Electronic Transaction Specification, Book 2: Programmer's Guide [online]. SET Secure Electronic Transaction LLC, Version 1.0, May 31, 1997 [retrieved on Sep. 6, 2001]. Retrieved from the Internet: <URL: http://www.setco.org/download/set_bk2.pdf. 629 pages (first 10 pages, including Table of Contents, are provided).

SET Secure Electronic Transaction Specification, Book 3: Formal Protocol Definition [online]. SET Secure Electronic Transaction LLC, Version 1.0, May 31, 1997 [retrieved on Sep. 6, 2001]. Retrieved from the Internet: <URL: http://www.setco.org/download/set_bk3.pdf. 262 pages (first 8 pages, including Table of Contents, are provided).

Web site for InstaBuy, CyberCash, Inc., 1999 (home page provided) [retrieved on Sep. 6, 2001]. Retrieved from the Internet: <URL: http://www.instabuy.com/.

How It Works, Signing Up, InstaBuy, CyberCash, Inc., 1999 [retrieved on Sep. 6, 2001]. Retrieved from the Internet: <URLs: http://www.instabuy.com/check_it_out.html. 1 page.

How It Works, Shopping with InstaBuy, CyberCash, Inc., 1999 [retrieved on Sep. 6, 2001]. Retrieved from the Internet: <URLs: http://www.instabuy.com/hiw_swi.html. 1 page.

How It Works, Shopping with Form Wizard, InstaBuy, CyberCash, Inc., 1999 [retrieved on Sep. 6, 2001]. Retrieved from the Internet: <URLs: http://www.instabuy.com/hiw_swfw.html. 1 page.

Consumers FAQ, InstaBuy, CyberCash, Inc., 1999 [retrieved on Sep. 6, 2001]. Retrieved from the Internet: <URL: http://www.instabuy.com/faq.html. pp 1-3.

Web site for Microsoft Passport, Microsoft Corporation, 1999-2000 (home page provided) [retrieved on Sep. 6, 2001]. Retrieved from the Internet: <URL: http://www.passport.com/Consumer/Default._asp?Ic=_1033.

Office Communication received in JP Appl. No. 2001-575808 on Aug. 10, 2010.

* cited by examiner

AUTHENTICATED PAYMENT

RELATED APPLICATION

This application is a continuation of U.S. application Ser. No. 09/818,084, filed Mar. 26, 2001, which claims the priority benefit of U.S. Provisional Patent Application Ser. No. 60/198,110, entitled "Authenticated Payment," by Greg Whitehead, Michael Graves, and Thane Plambeck, filed Apr. 17, 2000, the subject matter of each of which is incorporated herein by reference.

BACKGROUND OF THE INVENTION

1. Technical Field

This invention relates to authenticating buyers in online commerce transactions and, more particularly, to having a separate authentication service authenticate the buyer.

2. Background Art

As a result of the increasing popularity and acceptance of the Internet and other forms of networked communications, online commerce is big business. For example, the volume of consumer purchases, business to business commerce, and stock trading and other forms of investing which occur over the Internet and/or wireless networks is steadily increasing, as are other forms of online commerce. In addition, significant effort is being spent to develop alternate business models (such as auctions and group purchasing) and alternate forms of payment (such as ecash and Internet-authorized transfer of funds) in an attempt to take advantage of the unique characteristics of online commerce.

However, one of the drawbacks of online commerce is the difficulty of buyer authentication. For example, consider a case in which a consumer wishes to purchase an item using a credit card. If the buyer were doing this in the real world, the buyer would be required to supply his physical credit card (perhaps with a photo on it) and would have to sign the credit card slip with a signature matching the one on the credit card. These acts accomplish two important objectives. First, they establish with some confidence that the buyer is authorized to use the credit card. Second, they generate a record that makes it difficult for the buyer to later deny that he authorized the purchase. Both of these factors significantly reduce the risk of a fraudulent transaction.

In the online version of this transaction, the acts which correspond to supplying a physical credit card and signing the credit card slip either do not exist or, if they exist, are not as effective in reducing risk. For example, in many cases, the buyer is simply required to type in his credit card number and then click on a Make Purchase button. These two acts are more prone to fraud than their real world counterparts because the seller does not know if the person taking these actions is actually authorized to use the credit card. In other words, it is difficult for the seller to authenticate the buyer. Furthermore, even if the true credit card owner did authorize the transaction, the increased risk of fraud means that the resulting record is not as strong since the credit card owner could allege that an impostor authorized the transaction. This extra risk of fraud in the "card not present" situation results in higher interchange rates and fees for transactions processed over the Internet and other online commerce systems, and is perhaps the biggest single contributor to the cost basis for Internet commerce.

One of the reasons Internet and other online fraud has grown is that personal payment instrument information such as credit card numbers, checking account numbers, and related data has essentially become "public information" in the sense that this data is readily available. For example, a consumer gives his credit card number, expiration date, etc. in an unprotected format to each online merchant in each transaction. In addition, information such as name, address, social security number, etc. is also available from sources other than the card-holder. For example, searchable, web accessible telephone directories and other types of directories can contain much of this type of information. The repeated, unprotected disclosure of payment instrument information, together with the fact that much of this information is also available from other sources, increases the risk of fraudulent transactions. For example, hackers often need only to capture databases of credit card numbers and their associated name and address information in order to masquerade as the actual card-holder in many online transaction environments.

Conventionally, the buyer authentication problem has been addressed through the use of passwords, an approach commonly taken in Internet (web) commerce environments, where the buyer authenticates himself typically using a simple user name and password. As described previously, passwords have inherent weaknesses when used for this purpose and current implementations further aggravate these weaknesses. For example, consumers typically must register individually with each merchant using an on-line process. As a result, the merchant has a limited opportunity to verify the consumer's registration since the timing of the on-line registration often does not permit significant verification and, even if it did, the cost would be prohibitive since each merchant would have to bear the cost of his own verification. In addition, consumers often will use the same user name and password for multiple accounts. This increases the chance that the user name and password will be compromised and, if it is compromised, increases the potential damage suffered. Furthermore, since the user name and password typically are transferred to the merchant in plaintext, unscrupulous merchants may also use this information to compromise the consumer's other accounts. As a final example, many current authentication systems target authentication of the consumer's identity (e.g., proving that the user is actually John Doe), but authenticating someone's identity is not necessarily the same as verifying that someone is authorized to use a specific payment instrument.

The Secure Electronic Transactions (or SET) protocol was one attempt to address the buyer authentication problem in order to facilitate secure payment card transactions over the Internet. In SET, digital certificates were used to create a trust chain throughout the transaction. For example, the consumer would have a digital certificate which he presented to the merchant. The merchant would have a digital certificate which he presented to the consumer. Each would verify the other's digital certificate and the underlying chain of digital certificates in order to establish trustworthiness. However, this approach imposed considerable administrative and operational complexity on consumers, merchants, and the corresponding transaction processing infrastructure. For example, both buyers and merchants required specialized technology in order to participate in the protocol and would have to upgrade the technology each time new digital certificate technology was adopted. As a result, SET was not widely adopted.

Thus, there is a need for substantial buyer authentication in online commerce transactions. There is further a need for an approach to buyer authentication which is also flexible enough to easily adapt to varying levels of security for different applications and also to the adoption of new technologies. The approach preferably also does not impose significant burdens on or require extensive modification of the existing transaction processing infrastructure.

DISCLOSURE OF INVENTION

Figure 1:
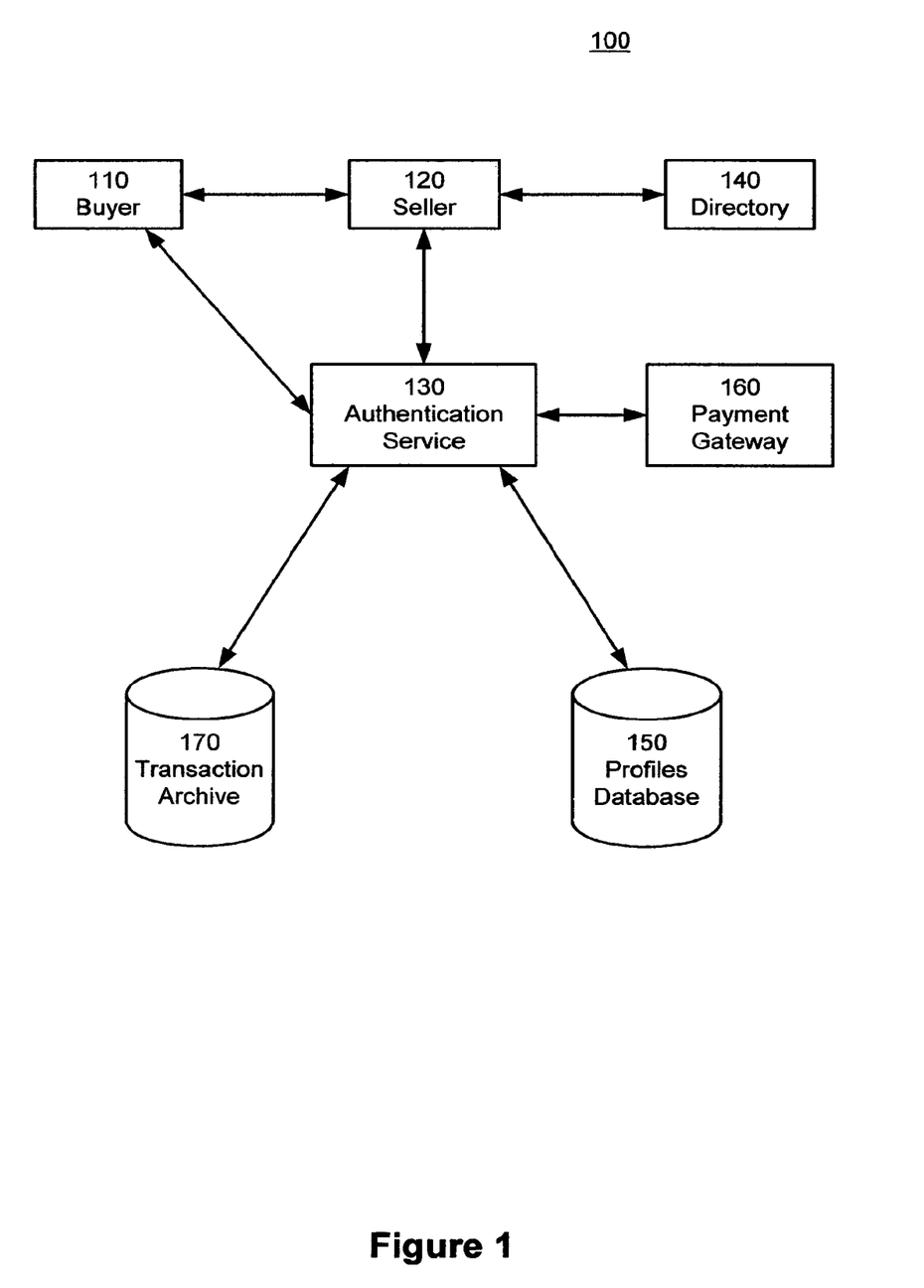
FIG. 1 is a block diagram of a system according to the present invention.
Figure 2:
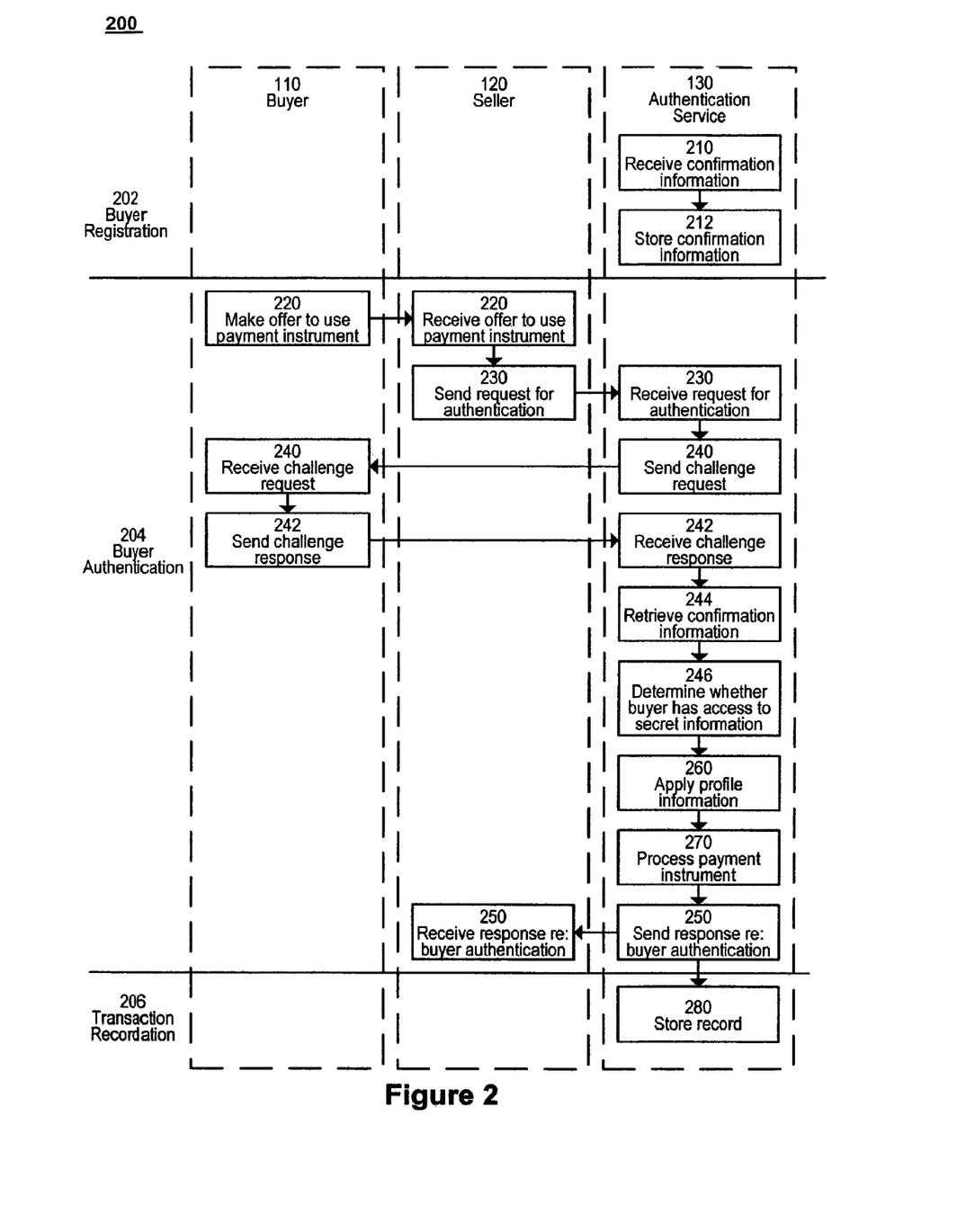
FIG. 2 is an event trace illustrating a method of operating the system of FIG. 1.

In accordance with the present invention, an online commerce transaction system (100) includes a buyer (110), a seller (120), and an authentication service (130). It is desired to authenticate (204) to the seller (120) that the buyer (110) is authorized to use a payment instrument as part of an online commerce transaction with the seller (120). To do this, the authentication service (130) performs the following steps, all of which occur in real-time as part of the online commerce transaction. The authentication service (130) receives (230) the request to verify that the buyer (110) is authorized to use the payment instrument. It determines (246) whether the buyer (110) has access to certain secret information without revealing the secret information to the seller (120). Access to the secret information would verify authority to use the payment instrument. Responsive to the determination of whether the buyer (110) has access to the secret information, the authentication service (130) transmits (250) to the seller (120) a response including whether the buyer (110) is authorized to use the payment instrument. In another aspect of the invention, the authentication service (130) also applies (260) profile information about the buyer (110) to the online commerce transaction and/or processes (270) or at least partially processes the payment transaction. The authentication service (130) may also store (280) a record of the use of the payment instrument and/or the transaction.

Figure 3:
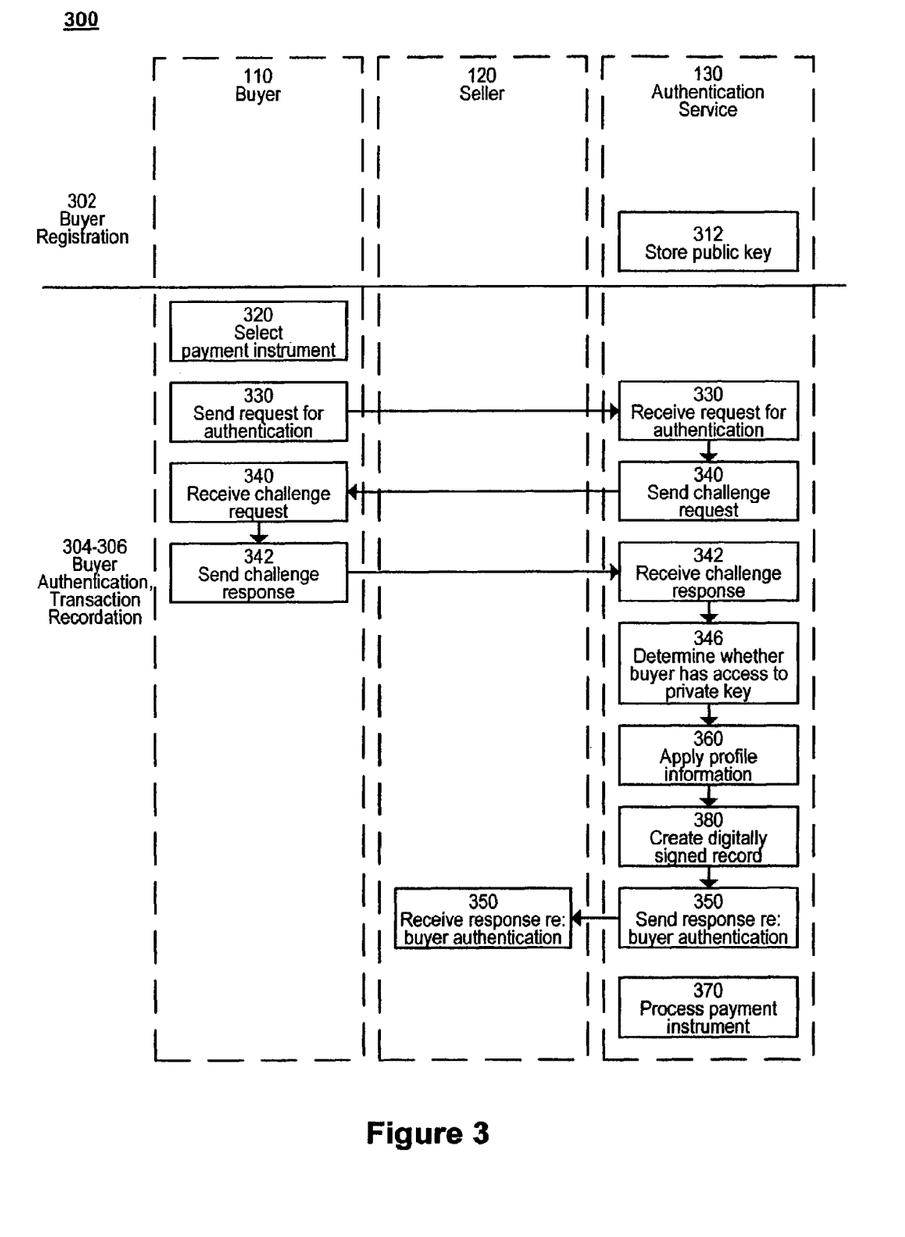
FIG. 3 is an event trace illustrating a preferred method of operating a preferred embodiment of the system of FIG. 1.
Figure 4:
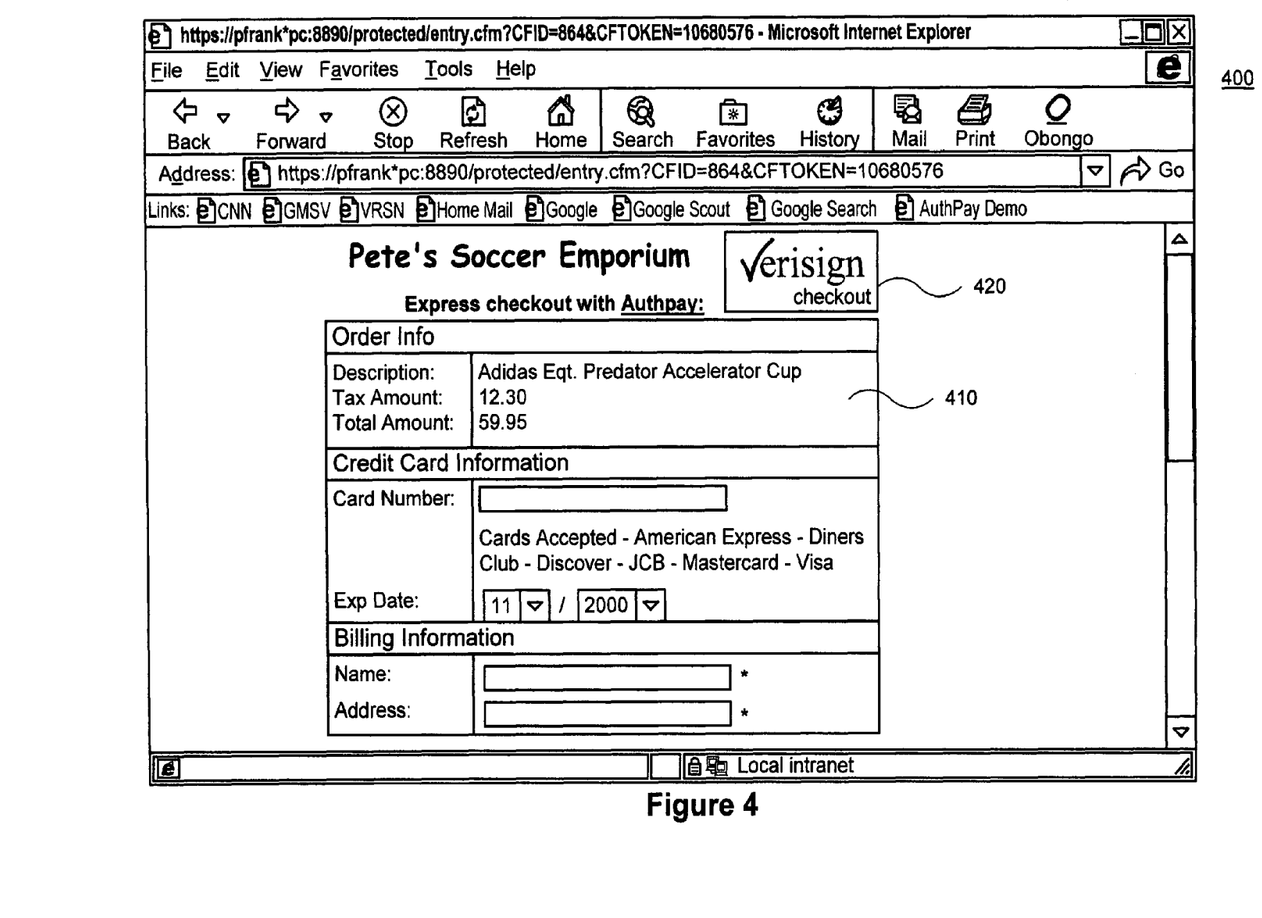
FIGS. 4-7 are various screen shots and dialog boxes illustrating the method of FIG. 3.

In a preferred embodiment (300), the online commerce transaction occurs over the Internet. The buyer (110) accesses the Internet via a web browser, the seller (120) operates an Internet storefront hosted by a web server, and the authentication service (130) is implemented on a web server. Furthermore, the secret information includes a private key. In other words, creating digital signatures using the private key would be proof that the signer is authorized to use the corresponding payment instrument. In this embodiment, the request (330) for authentication is triggered by the buyer's submission of a form (400), which includes an action attribute identifying the authentication service (130). The request (330) to the authentication service (130) also includes the seller's address so that the authentication service knows where to send (350) the results of its authentication process. To authenticate the seller (120), the authentication service (130) transmits (340) a challenge request to the buyer (110), requesting that the buyer (110) use the private key to digitally sign some data. The authentication service (130) uses the buyer's response (342) to determine (346) whether the buyer (110) has access to the private key and then transmits (350) the results to the seller (120). The authentication service (130) may further request that the buyer (110) digitally sign a record of the transaction, thus creating (380) a strong record of the transaction.

The present invention is particularly advantageous because a separate authentication service (130) rather than the seller (120) is used to authenticate the buyer (110). As a result, the seller (120) does not gain access to the secret information associated with the buyer's payment instrument. This prevents the seller (120) from later reusing the secret information to authorize fraudulent transactions.

Furthermore, concentration of the authentication function in the authentication service (130) results in significant flexibility and economies of scale. Many types of secret information may be appropriate, each requiring different technology to implement. Concentrating the authentication function in the authentication service (130) allows the cost of the required technology to be shared among many sellers (120). Furthermore, if the type of secret information or the corresponding buyer authentication procedure is changed, the bulk of the changes will affect only the authentication service (130), thus permitting new authentication technologies to be easily implemented. If the authentication service (130) performs other functions, such as adding buyer profile information to the transaction, processing of the payment instrument, or making and keeping records of the transactions, additional economies of scale may be realized, since the authentication service (130) is a natural centralized point for these other functions.

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

FIG. 1 is a block diagram of a system 100 according to the present invention. The system 100 includes a buyer 110, a seller 120 and an authentication service 130 which communicate with each other. System 100 also optionally includes a directory 140 of authentication services, which is accessible by buyer 110, and a database 150 of buyer profiles and a transaction archive 170, both of which are accessible by the authentication service 130. Optional payment gateway 160 is also accessible by the authentication service 130, although in alternate embodiments, it may be the seller 120, or both the authentication service 130 and the seller 120, which accesses the payment gateway 160. The payment gateway 160 is simply the conduit through which payment transactions are forwarded to the respective financial institutions. The present invention may be used with many different types of payment gateways 160 (or even no payment gateway) and is not intended to be limited to a specific type of gateway technology.

The buyer 110 wishes to use a payment instrument as part of an online commerce transaction with the seller 120. For example, in one application, the buyer 110 is a consumer, the seller 120 is a merchant with an Internet storefront, and the consumer wishes to use his credit card to purchase some product, information, or service from the merchant. As another example, the buyer 110 is an individual who connects to the seller 120 via a wireless phone or handheld personal digital assistant (PDA), the seller 120 is a bill-paying service, and the individual wishes to write "Internet checks" to pay his monthly bills. As yet another example, the buyer 110 is a corporation or individual acting on behalf of a corporation who is purchasing materials or services from the corporation's supplier 120. Other examples of payment instruments include checking account routing numbers, virtual money or electronic representations of cash, pre-purchased cash value stored in electronic wallets, purchase cards, and Internet credits or coupons.

It should be clear from these examples that many other applications are possible and the terms "buyer" and "seller" are used as convenient labels but are not meant to limit these entities. The "buyer 110" is not required to actually buy something nor is the "seller 120" required to actually sell. Similarly, the "online commerce transaction" is not limited to buy-sell transactions. Rather, the online commerce transaction could be any transaction in which the buyer 110 wishes to use a payment instrument as part of the transaction or, more generally, any transaction which would benefit from authentication of the buyer 110. As an example of an application which does not utilize a payment instrument, the "buyer" 110 might be an individual, the "seller" 120 might be an insurance company with which the buyer holds a policy, and the "transaction" might be that the buyer wishes to change his beneficiaries. The seller wishes to first authenticate the identity of the buyer before allowing access to his account.

FIG. 2 is an event trace illustrating operation 200 of system 100. The method 200 can be roughly broken down into three major parts: buyer registration 202, buyer authorization 204, and transaction recordation 206. Not all implementations will utilize all three stages 202-206 or all of the individual steps shown in FIG. 2, but they are included in this example to illustrate various aspects of the invention. In buyer registration 202, secret information which will be used in stage 204 to authenticate the buyer and payment instrument is established between the buyer 110 and the authentication service 130. Buyer registration 202 preferably occurs only once per payment instrument. Buyer authorization 204 occurs in real-time as part of the online commerce transaction. In this stage, the buyer 110 demonstrates access to the secret information to the authentication service 130. If this access is successfully demonstrated, the authentication service 130 informs the seller 120 that the buyer 110 is authorized to use the payment instrument. In the transaction recordation 206 stage, the authentication service 130 creates a record of the transaction, and this record may be subsequently used as evidence of whether a certain transaction occurred.

The use of a separate authentication service 130 has many advantages. For example, as will be more apparent from the descriptions below, the bulk of the buyer authentication process 204 is performed by authentication service 130. The authentication service 130 determines whether the buyer 110 has demonstrated access to the secret information and therefore is authorized to use the payment instrument. The buyer 110 is only minimally involved and the seller 120 is essentially not involved at all. Concentration of this function in the authentication service 130 results in significant flexibility and economies of scale. For example, different types of secret information ranging from simple PIN numbers to sophisticated digital certificate protocols can be used to yield different levels of security for different payment instruments. Different types of secret information typically will require different infrastructure to perform the buyer authentication stage 204. Concentrating the buyer authentication stage 204 in the authentication service 130 allows the cost of this infrastructure to be shared among many sellers 120. Furthermore, if the type of secret information or the corresponding buyer authentication procedure is changed, the bulk of the changes will affect only the authentication service 130, thus permitting new authentication technologies to be easily implemented. In contrast, previous approaches, such as SET, required each seller 120 to provide much of the necessary infrastructure. This led to high costs, slow initial adoption, and difficulty in switching to new technologies, which ultimately led to the failure of SET and similar approaches.

This approach is also advantageous because the seller 120 does not gain access to the buyer 110's secret information since the seller is not involved in buyer authentication 204. This prevents the seller 120 from later reusing the buyer 110's secret information to authorize fraudulent transactions. For example, assume that the secret information is a PIN number. If the seller 120 were responsible for buyer authentication 204, the buyer 110 would disclose his PIN number to the seller 120, who would be able to use it later for fraudulent purposes. However, in the current approach, the seller 120 discloses the PIN number only to the authentication service 130 and not to the seller 120.

Furthermore, since the buyer authentication stage 204 is concentrated in the authentication service 130, additional economies of scale may be realized by having the authentication service 130 also perform other functions, as will be further discussed below. For example, the authentication service 130 might add additional information to the transaction (e.g., the buyer's shipping address), process or partially process the buyer's payment instrument and/or make and keep records of the transactions.

Referring again to FIG. 2, each of the dashed boxes 110, 120, and 130 represents one of the components in system 100. The solid boxes represent various steps in method 200. The location of a solid box within a dashed box indicates that the step is generally performed by that component. For example, step 210 is located within the dashed box for authentication service 130. This indicates that the authentication service 130 generally performs step 210. Some steps have two boxes, indicating that the steps occurs over two components. For example, one component may send a message to another component. The steps preferably are implemented by software running on the various components within system 100, possibly assisted by hardware modules. They can also be implemented in hardware and/or firmware.

The buyer registration stage 202 preferably occurs before the actual online commerce transaction. In this stage 202, the secret information is established between the buyer 110 and the authentication service 130. The information is secret in the sense that, ideally, it is known and/or accessible only by the buyer (or by the buyer 110 and the authentication service 130 in the case of a secret shared by the two). It is not generally available to the public or to the sellers 120. Furthermore, the secret information corresponds to a specific payment instrument(s) and proving access to the secret information will be taken as authorization to use the payment instrument.

Different types of secret information may be used depending on the type of security required. Examples of secret information include a PIN number or password, a network-stored credential (e.g., to support roaming), a "roaming" digital signature capability, a software credential such as a private key local to the buyer's machine, a hardware credential such as a hardware token or a private key carried on a smart card, a biometric credential, and information used in cryptographic challenge response protocols.

In the specific example of FIG. 2, the secret information is established as follows. The authentication service 130 receives 210 confirmation information which enables the authentication service to later determine whether the buyer 110 has access to the secret information. The authentication service 130 then stores 212 this confirmation information associated with the payment instrument, for example as part of the buyer profile database 150. In one embodiment which follows this model, the buyer's secret information is a private key and the corresponding confirmation information is the corresponding public key.

In alternate embodiments, buyer registration 202 is implemented in other ways. For example, the confirmation information may not be stored at the authentication service 130. Instead, it may be stored elsewhere and retrieved by the authentication service 130 when required. Alternately, rather than storing confirmation information which is different from the secret information, the authentication service 130 may simply store the secret information itself (e.g., storing passwords or hashes of passwords). As another example, buyer registration 202 may occur offline. For example, the buyer 110 might fill out an application and send it to a bank. The bank verifies the information on the application, issues a credit card to the buyer 110, and sends the account information to the authentication service 130. The authentication service 130 creates a smart card with embedded secret information and the smart card is sent to the buyer 110, for example via the postal service. Note that in this last example, buyer registration 202 takes advantage of the credit card enrollment process. Buyer registration may also take advantage of other processes.

The secret information preferably is generated by the buyer 110 so as to minimize its disclosure to other parties. However, in alternate embodiments, it may be generated and/or shared by other parties, for example the authentication service, particularly when the risk posed by those parties is considered to be low.

In the buyer authentication stage 204, the buyer 110 wishes to use the payment instrument as part of an online commerce transaction with the seller 120. The authentication service 130 determines in real-time as part of the transaction whether the buyer 110 is authorized to do so. In the specific example of FIG. 2, this occurs as follows. The buyer 110 offers 220 to use the payment instrument. For example, the buyer 110 may offer to pay for a purchase using a credit card.

The seller 120 would like to know whether the buyer 110 is authorized to use the payment instrument, so he sends 230 a request to the authentication service 130 to verify the buyer's authority. Depending on the payment instrument, the identity of the authentication service 130 might not be immediately apparent. There may be more than one authentication service; for example, each credit card company might provide its own authentication service. One way to resolve this problem is with a directory 140 which associates authentication services with payment instruments. In this case, seller 120 accesses the directory 140 in order to determine which authentication service is the appropriate one for the payment instrument presented by the buyer 110.

The authentication service 130 determines whether the buyer 110 has access to the secret information in steps 240-246. The authentication service 130 sends 240 a "challenge request" to the buyer 110. The challenge request asks for proof that the buyer has access to the secret information. For example, if the secret information is a password, the challenge request may ask for the password. If the secret information is a private key, the challenge request may request that the buyer 110 digitally sign something using the private key. In one embodiment, the challenge request also includes a description of the online commerce transaction and allows the buyer to decline the transaction, for example if the description does not match the buyer's expectations. Equivalently, the challenge request may instead ask for the buyer's consent to the transaction. If the buyer 110 wishes to move forward, he sends 242 his "challenge response" back to the authentication service 130.

The authentication service 130 retrieves 244 the earlier stored confirmation information for the payment instrument and uses the confirmation information and challenge response to determine whether the buyer 110 has access to the secret information. For example, in one embodiment of the password example, the authentication service 130 hashes the alleged password from the challenge response and compares this to the hash stored as the confirmation information. In one embodiment of the private key example, the authentication service 130 uses the public key stored as confirmation information to determine whether the digitally signed message in the challenge response really was digitally signed using the corresponding private key.

The authentication service 130 then transmits 250 to the seller 120 a response to the seller's original request. The response includes whether the buyer 110 is authorized to use the payment instrument. It may also include additional information, as will be described in the context of steps 260 and 270. Note that during buyer authentication 204, the secret information is not revealed to the seller 120.

Before moving on to steps 260 and 270, note that the authentication steps 240-250 illustrated in FIG. 2 are just one way of implementing the buyer authentication stage 204. Other implementations will be apparent. For example, the authentication service 130 could receive 230 the request for authentication from the buyer 110 rather than the seller 120. As another example, the authentication service 130 might not use a challenge request 240 and challenge response 242. Proof of access to the secret information might be included as part of the initial request 230 instead. In addition, as mentioned in the buyer registration phase 202, the authentication service 130 may use methods besides confirmation information (steps 244 and 246) to determine whether the buyer has access to the secret information.

Returning to FIG. 2, in some embodiments, the authentication service 130 may also apply 260 additional buyer profile information to the transaction. For example, the seller 120 might request that the buyer's shipping address be added to the transaction. The authentication service 130 would retrieve this information from the database 150 and add it to the ongoing transaction. This additional information may be added at various points during the transaction and may involve communications with either the buyer 110 or seller 120. In the shipping address example, the buyer 110 might be asked to verify the address and/or the seller 120 might use the address to calculate shipping charges, which in turn would change the dollar amount of the transaction.

Similarly, the authentication service 130 may also process 270 the payment transaction, for example via payment gateway 160. On the one extreme, the authentication service 130 might simply notify 250 the seller 120 that the buyer 110 is authorized to use the payment instrument, but the seller 120 takes all other steps required to process the payment instrument. On the other extreme, it may be the authentication service 130 which takes the steps to process the payment transaction. In an intermediate case, the authentication service 130 takes some steps and the buyer completes the others.

Both buyer profiling 260 and payment processing 270 are attractive because the authentication service 130 is a natural centralized point for these activities. As with the actual authentication steps 240-246, economies of scale may be realized by having the authentication service 130 perform these functions rather than requiring each individual seller 120 to do so.

In the transaction recordation stage 206, the authentication service 130 stores 280 a record of the transaction in the transaction archive 170. The trustworthiness of the record will depend on the specific application. As one example, the authentication service 130 may simply store plaintext descriptions of the transaction. As another example, digitally signed and timestamped records may be more appropriate. Continuing the password example from above, a digital signed record may be created by having the authentication service digitally sign the record using its own private key. In the private key example, the buyer 110 himself creates a digitally signed record of the transaction using his own private key. In both of these examples, the result is a persistent, digitally signed record of the transaction, which can be used by the buyer 110, seller 120 or other parties to resolve disputes about the transaction.

FIGS. 3-7 illustrate a preferred embodiment of system 100 and method 200. In the Internet embodiment, the online commerce transaction occurs over an HTTP-based system, specifically the Internet. The buyer 110 accesses the Internet using a conventional web browser. The seller 120 is a merchant who operates a web site storefront on the Internet, fictitious Pete's Soccer Emporium in this case. The storefront runs on a conventional web server. The authentication service 130 also interfaces to the Internet via a web server. The buyer 110 desires to purchase the Adidas Eqt. Predator Accelerator Cup from Pete's Soccer Emporium using his credit card as the payment instrument. The secret information used to secure the transaction is a private key associated with the payment instrument. For convenience, this embodiment shall be referred to as the Internet embodiment, but this is not meant to imply that this embodiment is the only one possible for the Internet.

FIG. 3 is an event trace illustrating operation of the Internet embodiment. As with method 200, method 300 can be roughly broken down into three major parts: buyer registration 302, buyer authorization 304, and transaction recordation 306. However, the steps for buyer authorization 304 and transaction recordation 306 are intertwined with each other.

In the buyer registration phase 302, the buyer 110 sets up his "account" with the authentication service 130. In this case, this means that any offline investigation is conducted (e.g., receiving confirmation from the credit card company that the buyer 110 is authorized to use the credit card). In addition, a private key-public key pair for the account is generated and the public key is stored 312 in the authentication service's database 150. In a preferred embodiment, the public key is stored in the form of a digital certificate representing that the public key is tied to the buyer's account.

In this embodiment, the account and key pair are tied to a number of payment instruments, including the specific credit card to be used. In other words, the digital certificate and key pair are for the buyer's "wallet" which contains many payment instruments, rather than for one specific payment instrument. However, other embodiments may use different schemes, such as using a different account and key pair for each payment instrument. In addition, the buyer 110 may have a number of accounts and key pairs. In this embodiment, the buyer's private keys and associated public key infrastructure (PKI) services are managed for the buyer 110 by a software agent, specifically the VeriSign Personal Trust Agent (PTA). The PTA provides general purpose key and certificate management functionality and is designed to be easily incorporated into web applications.

The VeriSign PTA manages the buyer's PKI credentials. For example, if the buyer 110 does not have a digital certificate or key pair, the PTA takes the buyer 110 to a certificate enrollment page. If the buyer's digital certificate will soon expire, the PTA prompts the buyer 110 to renew the certificate before continuing and can take the buyer 110 to the certificate renewal page. Similarly, if the buyer's certificate has already expired, the PTA offers the option to go to the certificate renewal page to renew the expired certificate. All of this is implemented by a set of dialogs that are consistent across different browsers. Furthermore, although this specific embodiment uses browsers, the PTA also supports other devices, such as wireless phones and handheld PDAs.

The PTA and private keys may be hosted in a number of locations. In this example, a separate server (not shown) hosts the software implementing the PTA and stores the corresponding private keys. One advantage of this approach is that since the PTA and private keys are implemented as a zero-client, hosted service, no changes need be made to the buyer's browser. Another advantage is that since the buyer's browser does not require any special software, the buyer 110 potentially can access the PTA and his private keys from any standard browser. For an example of how this may be implemented, see co-pending U.S. patent application Ser. No. 09/574,687, "Server-Assisted Regeneration of a Strong Secret from a Weak Secret," by Warwick Ford, filed May 17, 2000, which subject matter is incorporated herein by reference. If the server hosting the PTA is the same as the one hosting the authentication service 130, the two functions may be integrated to some degree. In an alternate embodiment, the PTA and/or corresponding private keys are implemented on the buyer's client. For example, the PTA may be implemented as a plug-in (e.g., ActiveX control) to the buyer's browser and the private keys stored locally on the buyer's client or in dedicated hardware (e.g., a hardware token).

Continuing the soccer example, after registering 302, the buyer 110 is shopping at Pete's and decides to buy some products. FIG. 4 is a screen shot of the buyer's browser as he is beginning the checkout process. The HTML order form 400 includes an order area 410 and also a button 420 for express, authenticated payment. The order area indicates that the total plus tax for this order is $59.95. The buyer 110 could check out in an unauthenticated manner using the rest of the form, filling in credit card information, billing address, etc. However, the buyer 110 wishes to use authenticated payment and instead clicks the button 420 for "AuthPay" (i.e., authenticated payment).

As a result of clicking the authenticated payment button 420, a request for authentication is sent 330 from the buyer's browser to the authentication service 130. The request includes a description of the payment transaction and also identifies the seller 120. The authentication service 130 determines whether the buyer 110 has access to the secret information (in this case, the private key for the selected account) in steps 340-346. In particular, the authentication service 130 sends 340 a challenge request to the buyer 110. The challenge request asks the buyer 110 to digitally sign some data using the private key for the selected account. The buyer 110 sends 342 his challenge response back to the authentication service 130. The authentication service 130 retrieves the earlier stored public key and uses it to determine 346 whether the buyer 110 has access to the corresponding private key. The authentication process typically is carried out between computers without the human buyer 110's active participation.

Figure 5A:
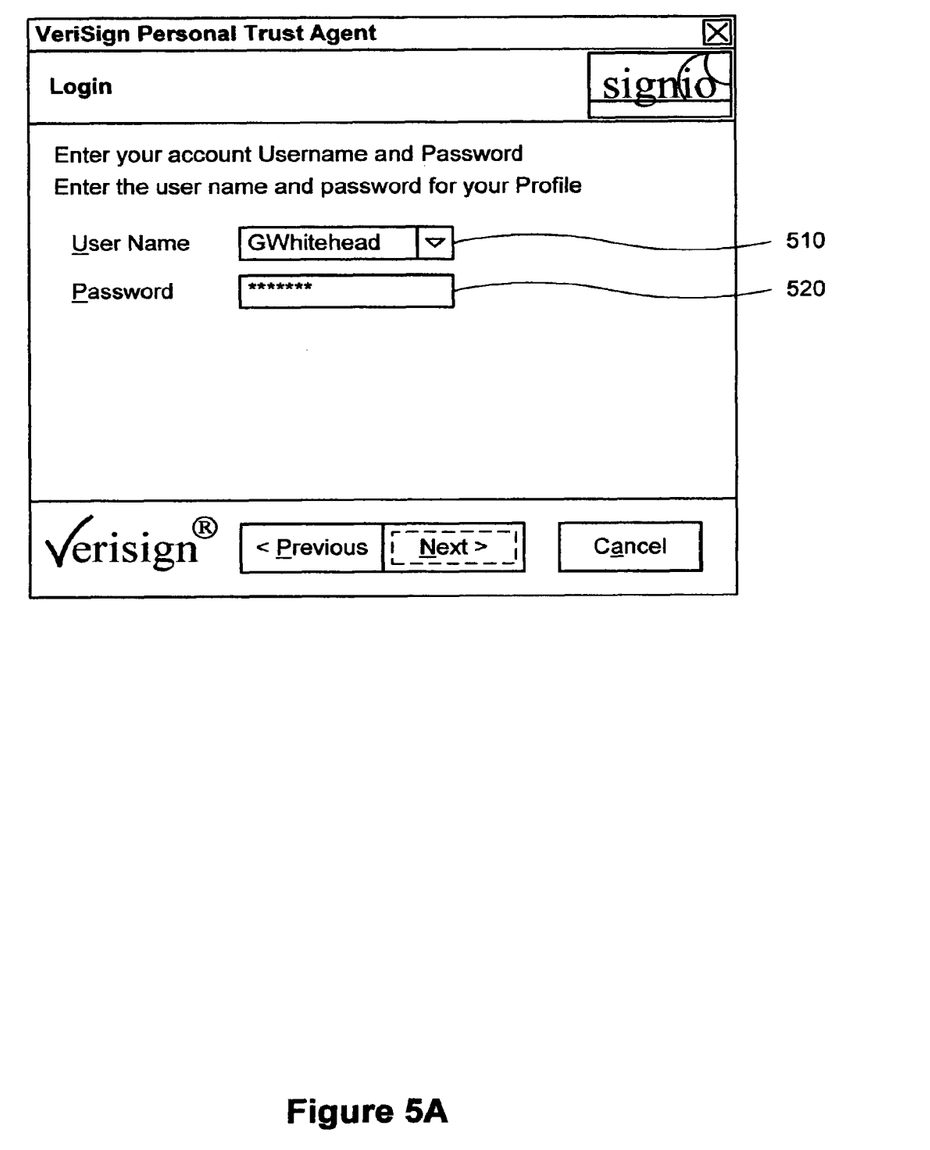
Figure 5B:
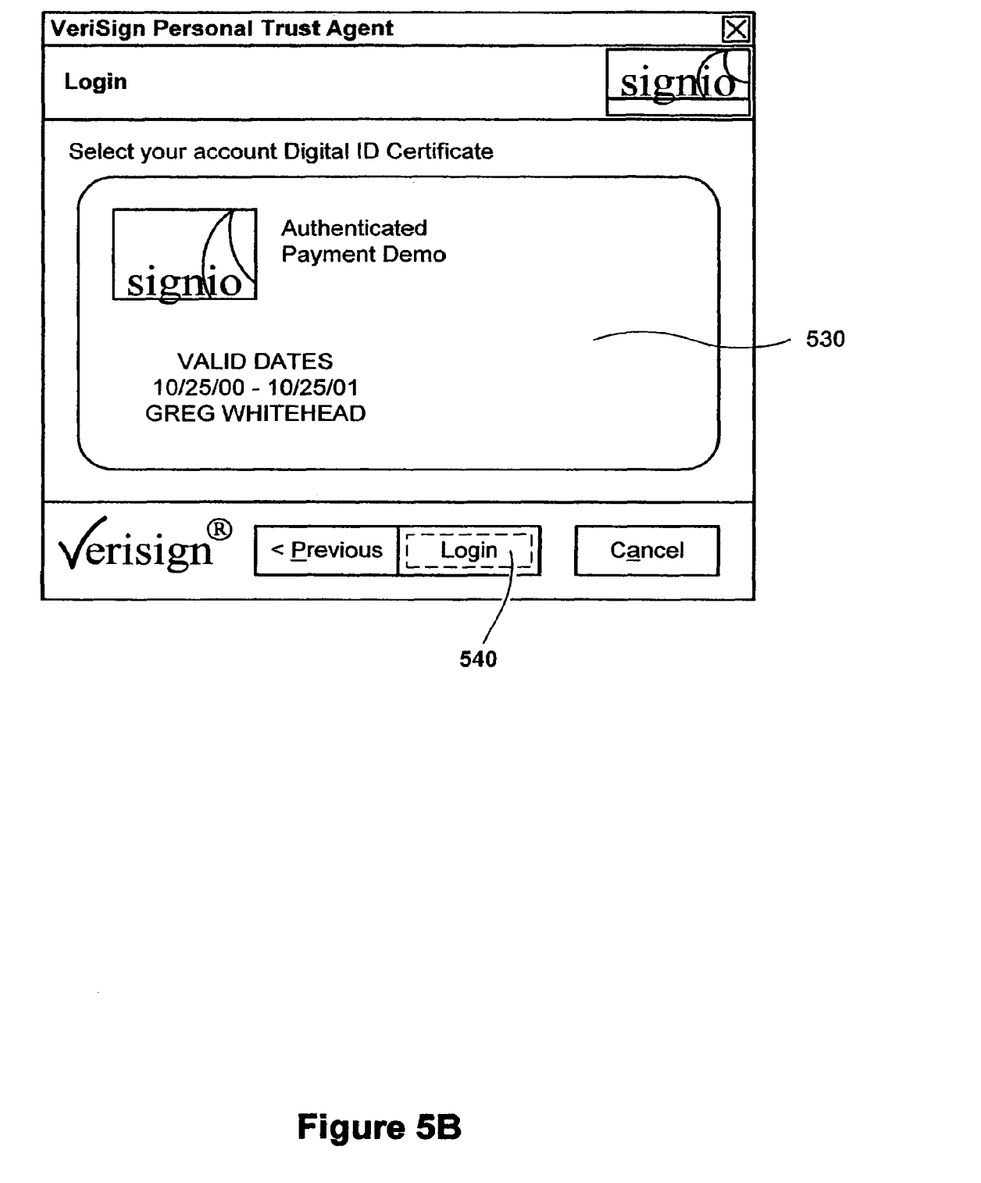
Figure 6:
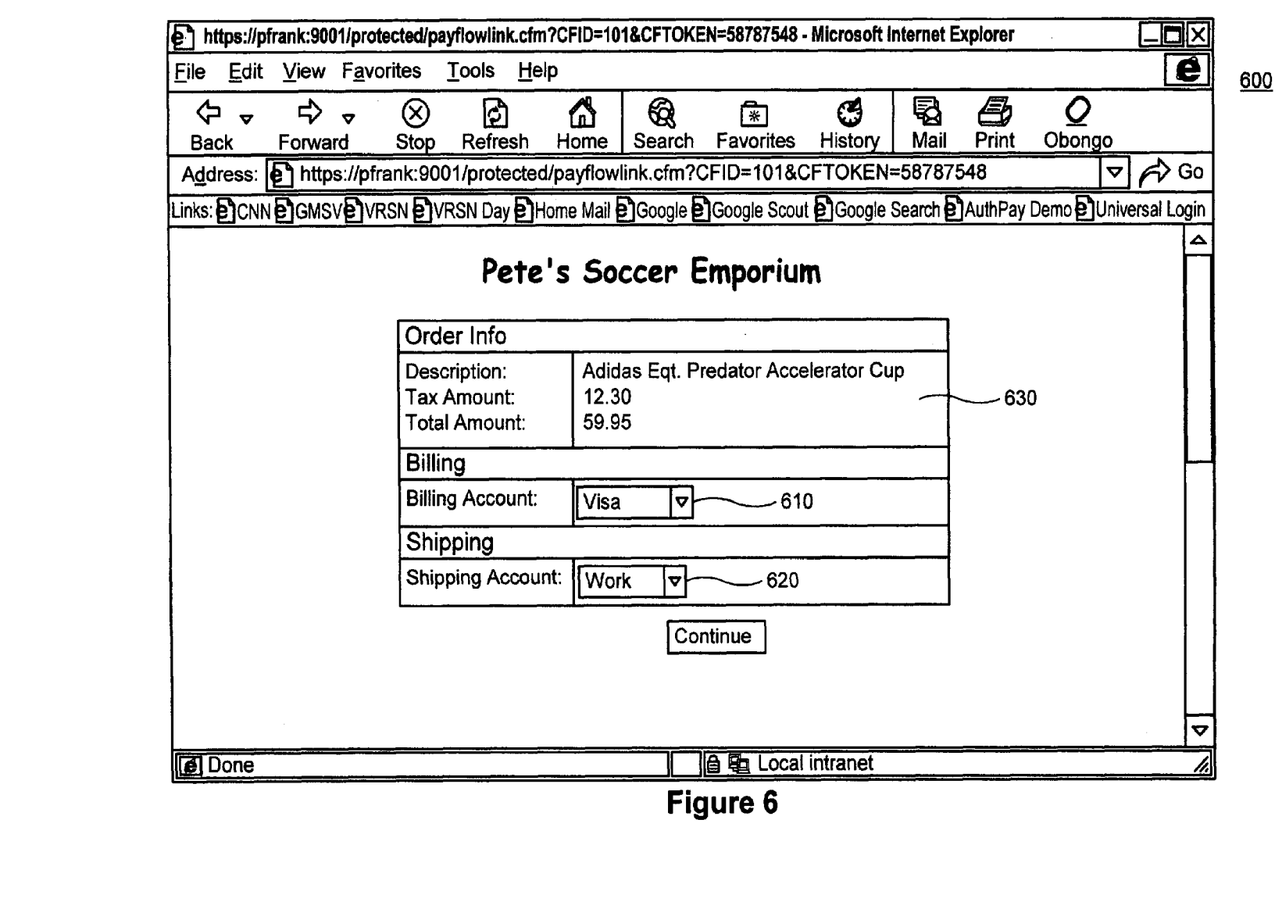

In this embodiment, the PTA is also invoked in order to allow the buyer 110 to select which of his accounts he wishes to use and later to select the specific payment instrument from within the account. More specifically, clicking button 420 causes the buyer's web browser to interact with the PTA via the dialog boxes in FIGS. 5A and 5B. In FIG. 5A, the buyer 110 specifies which account he wishes to use by filling in the User Name field 510 and then authenticates himself to the PTA by filling in the correct password 520. The PTA displays the dialog box of FIG. 5B, which includes a visual representation 530 of the account selected. The buyer 110 confirms that he wishes to use this account by clicking on the Login button 540. The private key for the account is now available for authentication and digital signature.

If the buyer 110 fails the authentication step, the authentication service 130 takes appropriate actions. For example, it might notify the seller 120 that the buyer was not authenticated. Alternately, it may refuse to further process the transaction and return the buyer 110 to an earlier screen (e.g., the check-out screen 400).

If the buyer 110 is authenticated, the authentication service 130 applies 360 additional buyer profile information to the transaction. In this case, the authentication service 130 retrieves buyer profile information and sends this information to the browser as the form shown in FIG. 6. The information includes the different payment instruments 610 in this account and also different shipping addresses 620. This buyer profile information can be of a sensitive nature so it is preferable that the authentication service 130 authenticate the buyer 110 before sending the information to him. The form also reiterates information 630 about the transaction. The buyer 110 selects the payment instrument 610 and billing address 620 and submits the form by clicking the Continue button.

Figure 7A:
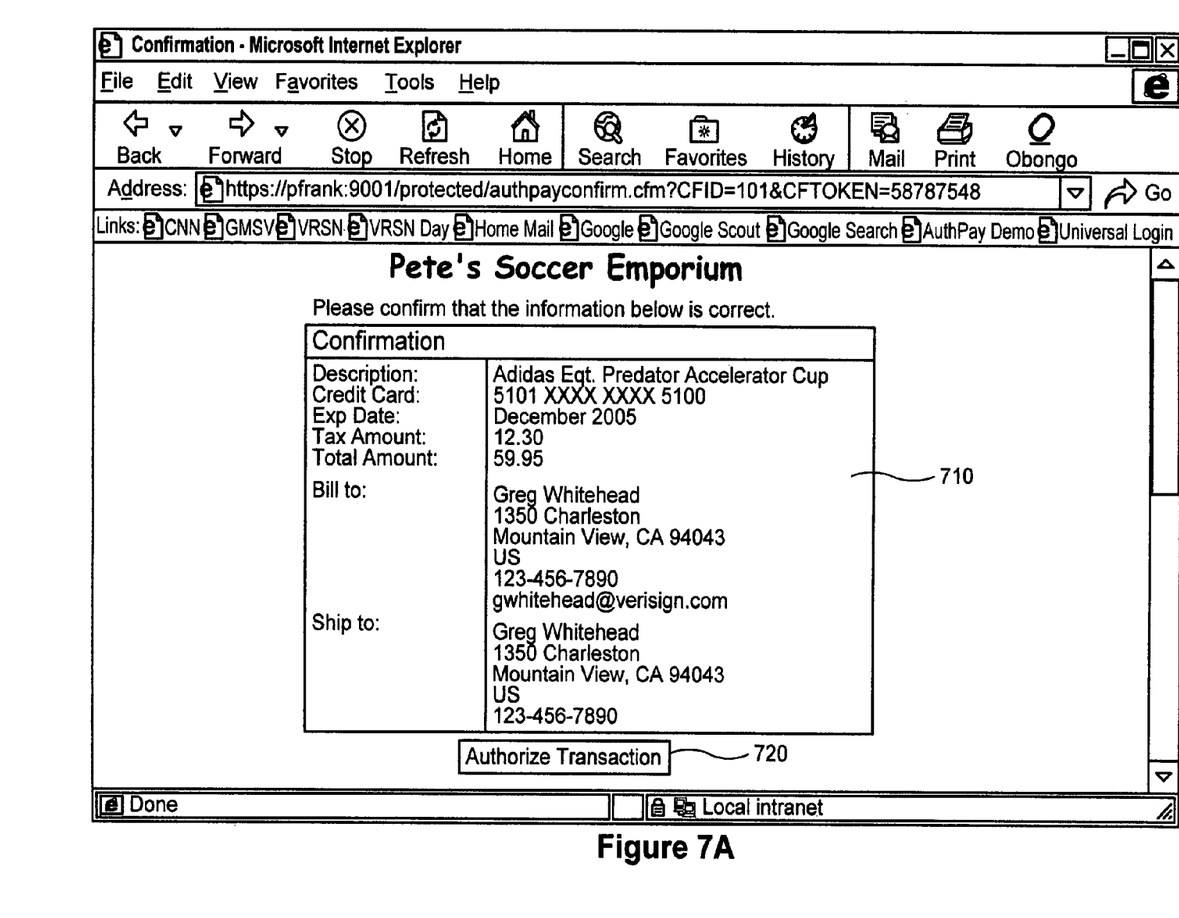
Figure 7B:
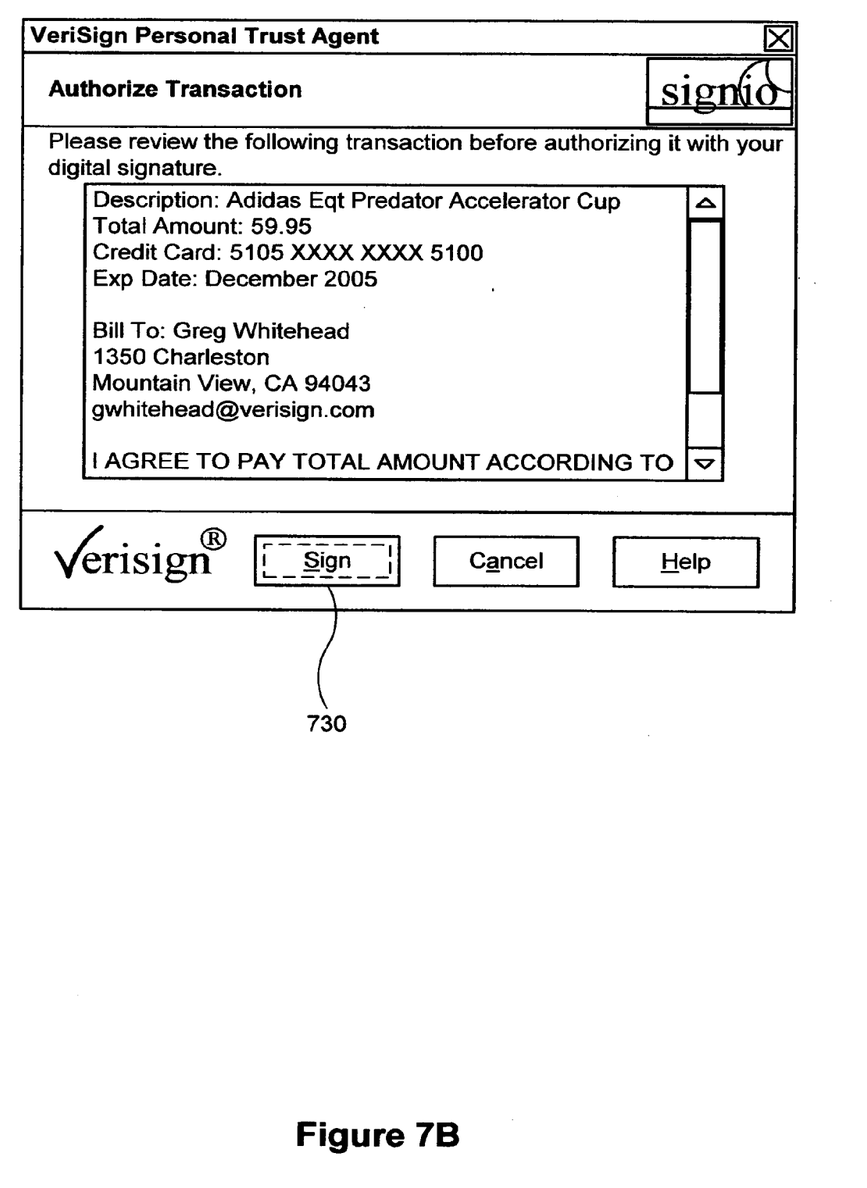

The buyer 110 and authentication service 130 create 380 a digitally signed record of the transaction using the form and dialog box shown in FIGS. 7A and 7B. In response to the submission of the form 600, the authentication service 130 returns the form of FIG. 7A which contains a summary 710 of the transaction and requests that the buyer 110 authorize the transaction. The buyer 110 does so by clicking on the Authorize Transaction button 720. This invokes the PTA dialog box of FIG. 7B. By clicking the Sign button 730, the buyer causes the PTA to digitally sign the summary, thus creating a digitally signed record of the transaction. The authentication service 130 then notifies 350 the seller 120 that the buyer is authorized to use the payment instrument and preferably also notifies the buyer that the transaction was approved.

In this embodiment, the authentication service 130 also processes 370 the payment instrument for the seller 120 via a payment gateway 160, such as the Payflow service available from VeriSign.

The transmission of information between the buyer 110, seller 120 and authentication service 130 in method 300 is accomplished using conventional web techniques. For example, note that form 400 is served by the seller 120 but clicking on the authenticated payment button 420 hands off the buyer's browser from the seller 120 to the authentication service 130. Similarly, once the authentication process is completed, the buyer's browser is returned from the authentication service 130 to the seller 120.

Both of these transfers are accomplished using conventional techniques, such as GET, POST, and/or redirect. For example, the transfer can be accomplished by an HTTP POST of a form containing the data to be conveyed. This is robust but sometimes results in unwanted, intermediate web pages. However, an automatically triggered client script can be used to eliminate the need to click through the intermediate pages. Another option is HTTP redirect to a URL which contains the data to be conveyed. This can eliminate intermediate pages but is currently limited in the amount of data that can be conveyed (since only HTTP GETs can be redirected). Another option is HTTP redirect to a URL which references the location of the data to be conveyed, with the data actually transferred via some other mechanism. This is more complex than the other two methods, but can eliminate intermediate pages without limiting the amount of data that can be conveyed. The data is transmitted by some other mechanism and at the destination, it is assigned an identifier and cached. The buyer 110 is then redirected with a URL containing the assigned identifier.

As a simplified example, assume for the moment that clicking the authenticated payment button 420 sends a request for authentication to the authentication service 130. In one embodiment, this is achieved by using a form 400 with the following structure:

```
<form method=post
action="https://authpay.verisign.com/authenticate.dll">
    <input type="hidden" name="returnURL"
    value="https://www.seller.com/process">
    <input type="hidden" name="msg"
    value="PayerAuth Request goes here">
    <input type=submit value="Auth Pay">
</form>
``` https://authpay.verisign.com/authenticate.dll is the URL of the authentication service 130. The returnURL field specifies a location at the seller 120's web site to which the buyer 110 is returned after authentication is completed. The msg field carries the request for authentication. Other fields may be used to support additional functionality, such as applying profile information or payment processing.

Upon completion of the payment authorization process, the buyer 110 is handed from the authentication service 130 back to the seller 120 via an HTTP POST to the returnURL specified in the request. The HTML form posted back to the seller 120 has the following structure:

```
<form method=post action="https://www.seller.com/process">
    <input type="hidden" name="transID"
    value="123456789">
    <input type="hidden" name="msg"
    value="PayerAuth Response goes here">
    <input type=submit value="Continue">
</form>
```

The transID field contains a transaction identifier that can be used by either the buyer 110 or seller 120 to refer to the transaction in the transaction archive 170. The msg field carries the response from the authentication service 130 to the seller 120.

Although the invention has been described in considerable detail with reference to certain preferred embodiments thereof, other embodiments are possible. For example, in a wireless (e.g. WAP-based) embodiment, some or all of the communications between buyer 110, seller 120 and authentication service 130 occur via wireless connections or via gateways connecting the wireless infrastructure to the wired infrastructure. For example, the buyer 110 might be communicating from a WAP-enabled handheld device. Therefore, the scope of the appended claims should not be limited to the description of the preferred embodiments contained herein.

The invention claimed is:

1. A computer-implemented method, performed by a computer system comprising one or more processors and computer memory, for authenticating an electronic payment transaction over a communications network, comprising:

at a payment authentication service operated by the computer system, linking secret information to at least a first payment instrument of a buyer in computer memory, the secret information being known only to the buyer;

receiving an electronic request to authenticate the buyer as being authorized to use the first payment instrument in an electronic payment transaction;

subsequent to the step of linking the secret information to the first payment instrument in computer memory and in response to receiving the electronic request to authenticate the buyer, sending a challenge request to the buyer over the network, the challenge request including a summary of the payment transaction;

subsequent to the step of linking the secret information to the first payment instrument in computer memory, receiving an electronic indication of a selection of the first payment instrument from the buyer;

receiving a challenge response from the buyer over the network, the challenge response proving that the buyer has access to the secret information;

in response to receiving the challenge response, determining that the buyer has access to the secret information and that the buyer is authorized to use the first payment instrument; and notifying a seller that the buyer is authorized to use the first payment instrument.

2. The method of claim 1, wherein the secret information is a secret encryption key of the buyer, and wherein said step of linking the secret information further comprises linking a corresponding public key to the first payment instrument in computer memory.

3. The method of claim 1, wherein the electronic request to authenticate the buyer as being authorized to use the first payment instrument is received from the seller.

4. The method of claim 1, wherein the electronic request to authenticate the buyer as being authorized to use the first payment instrument is received from the buyer.

5. The method of claim 1, further comprising:
generating a digitally signed record of the transaction once the transaction is complete.

6. The method of claim 5, wherein the secret information is a secret encryption key of the buyer, and wherein the record of the payment transaction is digitally signed using the buyer's secret encryption key.

7. The method of claim 5, wherein the record of the online transaction is digitally signed using a private key of the payment authentication service.

8. The method of claim 5, further comprising, subsequent to generating the signed record of the transaction:
storing the signed record of the transaction in computer memory;
in response to a dispute related to the payment transaction, retrieving the stored signed record of the transaction from computer memory; and
based upon the contents of the signed record of the transaction, resolving the dispute related to the payment transaction.

9. The method of claim 1, wherein the step of determining that the buyer has access to the secret information comprises decrypting a portion of the received challenge response using a public key of the buyer.

10. A tangible computer-readable medium storing instructions that, when executed by one or more processors, cause the one or more processors to perform a method comprising:
at a payment authentication service, linking secret information to at least a first payment instrument of a buyer, the secret information being known only to the buyer;
receiving a request to authenticate the buyer as being authorized to use the first payment instrument in a payment transaction;
subsequent to the step of linking the secret information to the first payment instrument and in response to receiving the request to authenticate the buyer, sending a challenge request to the buyer over the network, the challenge request including a summary of the payment transaction;
subsequent to the step of linking the secret information to the first payment instrument, receiving a selection of the first payment instrument from the buyer;
receiving a challenge response from the buyer over the network, the challenge response proving that the buyer has access to the secret information;
in response to receiving the challenge response, determining that the buyer has access to the secret information and that the buyer is authorized to use the first payment instrument; and
notifying the seller that the buyer is authorized to use the first payment instrument.

11. The computer-readable medium of claim 10, wherein the secret information is a secret encryption key of the buyer, and wherein said step of linking the secret information further comprises linking a corresponding public key to the first payment instrument.

12. The computer-readable medium of claim 10, wherein the method specified by the stored instructions further comprises:
generating a digitally signed record of the transaction once the transaction is complete.

13. The computer-readable medium of claim 12, wherein the method specified by the stored instructions further comprises:
subsequent to generating the signed record of the transaction:
storing the signed record of the transaction;
in response to a dispute related to the payment transaction, retrieving the stored signed record of the transaction; and
based upon the contents of the signed record of the transaction, resolving the dispute related to the payment transaction.

14. The computer-readable medium of claim 10, wherein the step of determining that the buyer has access to the secret information comprises:
decrypting a portion of the received challenge response using a public key of the buyer.

15. A system for authenticating a payment transaction over a network, comprising:
a transaction archive; and
an authentication service web server coupled to the transaction archive and the network, the authentication service web server configured to:
link secret information to at least a first payment instrument of a buyer, the secret information being known only to the buyer;
receive a request to authenticate the buyer as being authorized to use the first payment instrument in a payment transaction;
subsequent to the step of linking the secret information to the first payment instrument and in response to receiving the request to authenticate the buyer, send a challenge request to the buyer over the network, the challenge request including a summary of the payment transaction;

subsequent to the step of linking the secret information to the first payment instrument, receive a selection of the first payment instrument from the buyer;

receive a challenge response from the buyer over the network, the challenge response proving that the buyer has access to the secret information;

in response to receiving the challenge response, determine that the buyer has access to the secret information and that the buyer is authorized to use the first payment instrument; and notify the seller that the buyer is authorized to use the first payment instrument.

16. The system of claim 15, wherein the secret information is a secret encryption key of the buyer, and wherein the authentication service web server is configured to link the secret information by linking a corresponding public key to the first payment instrument.

17. The system of claim 15, wherein the authentication service web server is further configured to:

generate a digitally signed record of the transaction once the transaction is complete.

18. The system of claim 17, wherein the authentication service web server is further configured to:

subsequent to the step of generating the signed record of the transaction:

store the signed record of the transaction;

in response to a dispute related to the payment transaction, retrieve the stored signed record of the transaction; and based upon the contents of the signed record of the transaction, resolve the dispute related to the payment transaction.

19. The system of claim 15, wherein the authentication service web server is further configured to determine that the buyer has access to the secret information by decrypting a portion of the received challenge response using a public key of the buyer.

* * * * *

UNITED STATES PATENT AND TRADEMARK OFFICE
CERTIFICATE OF CORRECTION

PATENT NO. : 7,983,993 B2  
APPLICATION NO. : 12/842270  
DATED : July 19, 2011  
INVENTOR(S) : Michael E. Graves et al.

Page 1 of 1

It is certified that error appears in the above-identified patent and that said Letters Patent is hereby corrected as shown below:

Title page, item (63) Related U.S. Application Data: "Continuation of application No. 09/818,084, filed on Mar. 26, 2001, now Pat. No. 7,778,934."
should read -- Continuation of application No. 09/818,084, filed on Mar. 26, 2001, now Pat. No. 7,778,934, which claims benefit of 60/198,110. --

Signed and Sealed this
Twenty-third Day of June, 2015

Michelle K. Lee
*Director of the United States Patent and Trademark Office*